United States Patent [19]

Bourdin et al.

[11] 3,875,247

[45] Apr. 1, 1975

[54] PROCESS FOR PREPARING ALKYLPHENOLS BY OXIDISING ALKYLBENZALDEHYDES

[75] Inventors: Francois Bourdin, Lyon; Francois Chizat, Bron; Michel Costantini, Lyon; Michel Jouffret, Francheville Le Bas, all of France

[73] Assignee: Rhone-Poulenc S.A., Paris, France

[22] Filed: Oct. 5, 1972

[21] Appl. No.: 295,165

[30] Foreign Application Priority Data
Oct. 6, 1971  France ............................. 71.35969

[52] U.S. Cl. ...... 260/621 G, 260/621 R, 260/479 R, 260/624 R, 260/626 R, 260/626 T
[51] Int. Cl. ............................................ C07c 37/00
[58] Field of Search ........ 260/479 R, 621 R, 621 G, 260/624 R, 626 R, 626 T

[56] References Cited
UNITED STATES PATENTS
3,585,243        Gradeff ...................... 260/621 G X OTHER PUBLICATIONS
Ogata, "J. Org. Chem.," Vol. 26, pp. 4803–4808, 1961.

*Primary Examiner*—Leon Zitver
*Assistant Examiner*—Norman P. Morgenstern
*Attorney, Agent, or Firm*—Stevens, Davis, Miller & Mosher

[57] ABSTRACT o- and/or p-alkylphenols with 1 or 2 $C_{1-10}$ alkyl groups are prepared by oxidising the corresponding alkylbenzaldehyde with hydrogen peroxide in the presence of an acid of $pK_a$ less than 3 which is an organic acid or organic sulphonic acid.

10 Claims, No Drawings

PROCESS FOR PREPARING ALKYLPHENOLS BY OXIDISING ALKYLBENZALDEHYDES

This invention relates to a process for the preparation of alkylphenols, especially cresols, by oxidizing alkylbenzaldehydes using hydrogen peroxide.

Cresols form a particularly important class of industrial products which are used in the manufacture of resins, plasticisers, anti-oxidants and agricultural compounds. The majority of the cresols used in industry are extracted from the alkaline wash liquors of petroleum distillates or coal tars. They are generally obtained in the form of mixtures with phenol and xylenols. The extraction processes are generally complicated and separation of the various cresols can be achieved only after numerous stages of distillation and treatment of the extracts. Besides these extraction processes, various methods for synthesising cresols have been proposed. It is possible to prepare them by the hydrolysis of diazonium salts of toluidines, the alkaline fusion of toluenesulphonic acids, the alkylation of phenol or the acid decomposition of isopropyltoluene hydroperoxides. None of these methods is completely satisfactory, either because of the reaction conditions (for example, the use of high temperatures or corrosive mixtures), because of the use of starting materials which are not readily avilable, or because they lead to a mixture of cresol isomers.

Phenols can be prepared by oxidizing an aromatic aldehyde either by means of a peracid such as peracetic acid or perbenzoic acid or by means of hydrogen peroxide alone, in which case the BAYER and WILLIGER reaction is involved, or by means of hydrogen peroxide in an alkaline medium, in which case the DAKIN reaction is involved. As a general rule, the BAYER and WILLIGER reaction leads to the almost quantitative formation of a phenol when the aromatic aldehyde possesses an electron donor group (such as a hydroxyl or alkoxy group), the said phenol generally being obtained as its formate. On the other hand, when the aromatic ring carries an electron acceptor group (a nitro group, methylcarbonyloxy group or halogen atom) the reaction leads to the formation of the corresponding benzoic acids. Although this rule is widely confirmed, there are nevertheless some exceptions. Thus, Y. OGATA et al., J. Org. Chem., 26, 4803 (1961) report that 4-methoxybenzaldehyde is oxidized principally to the corresponding acid, by perbenzoic acid in benzene; likewise, and although the methyl group, in the same way as the other alkyl groups, is considered to be an electron donor group, p-tolualdehyde leads to p-toluic acid with a yield of 74% and to p-cresol with a yield of 26%. Furthermore, although the BAYER and WILLIGER reaction is catalysed by acids, and although it leads to the formation of an acid or a phenol, it has not been possible to establish any general rule with regard to the influence of the acidity of the medium on the orientation of the reaction. Thus, Y. OGATA et al., loc. cit., note that during the oxidation of o- and p-hydroxybenzaldehydes, using perbenzoic acid in methanol, the diphenol is formed exclusively, whether the medium is acid, neutral or alkaline. In contrast, in the case of benzaldehyde and aldehydes possessing electron acceptor groups, the corresponding benzoic acid is formed exclusively, whether the medium is acid, neutral or alkaline. o- and p-methoxybenzaldehyde principally give the acid in an alkaline medium and the phenol in a neutral or acid medium.

Although the DAKIN reaction has made it possible to prepare various diphenols from hydroxybenzaldehydes (o- and p-hydroxybenzaldehydes; 5-nitro-2-hydroxybenzaldehyde; 4-hydroxy-3-methoxybenzaldehyde and the like) it only gives rise to the formation of benzoic acids from benzaldehydes which do not contain a hydroxyl group (cf. DAKIN, Proc. Chem. Soc., 25, 194 and thereafter (1909). It has been found experimentally that p-tolualdehyde is not oxidized to the cresol by the DAKIN reaction.

Furthermore, attempts have been made to oxidize various aromatic aldehydes by means of hydrogen peroxide in a neutral aqueous medium or in an organic solvent medium (acetone, ether or pyridine); under these conditions, the corresponding acid is obtained principally or exclusively, and in certain cases, low yields of phenols. Thus, A. WACEK et al., Ber., 73, 644 (1940) have oxidised o- and p-hydroxybenzaldehydes essentially to acids, by means of hydrogen peroxide in a neutral aqueous medium, in acetone and in pyridine; according to E. SPATH et al., Ber., 73, 935 (1940), the oxidation of various methoxybenzaldehydes using hydrogen peroxide in ether leads to low yields of phenols.

The present invention provides a process for the preparation of an alkylphenol of the general formula:

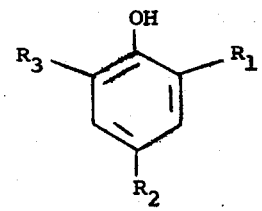

wherein each of $R_1$, $R_2$ and $R_3$, which may be the same or different, represents a hydrogen atom or a linear or branched alkyl radical containing 1 to 5 carbon atoms, with the proviso that the number of alkyl groups represented by symbols $R_1$, $R_2$ and $R_3$ is 1 or 2, which comprises oxidizing an alkylbenzaldehyde of the general formula:

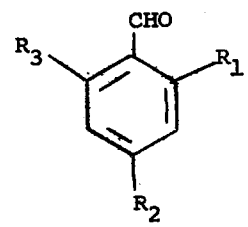

wherein $R_1$, $R_2$ and $R_3$ are as defined above, with hydrogen peroxide in the presence of an acid with a dissociation constant in water greater than $10^{-3}$, which is an inorganic acid or sulphonic acid and, if necessary converting any formate ester of the phenol of formula I into the phenol of formula I.

Each of $R_1$, $R_2$ and $R_3$, which may be the same or different, preferably represents a hydrogen atom, a methyl, ethyl, propyl, isopropyl, n-butyl, isobutyl, t-butyl or n-pentyl group, with the proviso that the number of alkyl groups represented by the symbols $R_1$, $R_2$ and $R_3$ is 1 or 2.

o-Tolualdehyde, p-isopropylbenzaldehyde, p-(tertiary butyl)-benzaldehyde, 2,4-dimethylbenzaldehyde, 2-methyl-4-isopropylbenzaldehyde and 2-methyl-4-t-butyl-benzaldehyde and especially p-tolualdehyde are preferred aldehydes of the formula (II) which can be oxidized to the corresponding phenol.

The strong acid used in the process of the invention may be an oxygen-containing inorganic acid such as sulphuric, nitric or perchloric acid or chloro-sulphonic acid, a hydracid such as hydrochloric or hydrbromic acid; a sulphonic acid such as methane-sulphonic, ethane-sulphonic, ethane-disulphonic, methoxy-sulphonic, benzene-sulphonic, benzene-disulphonic, toluene-sulphonic, naphthalene-sulphonic or disulphonic acid or a sulphonated polymer such as one derived from styrene (for example, a sulphonated styrene/divinylbenzene copolymer).

The amount of acid, expressed in equivalents of protons with respect to the number of molecules of hydrogen peroxide present in the reaction mixture, can vary within wide limits. Thus it is possible to carry out the reaction with $H^+/H_2O_2$ ratios of between $1 \times 10^{-4}:1$ and $0.5:1$. Usually, it is not necessary to use $H^+/H_2O_2$ ratios which are greater than $1 \times 10^{-1}:1$.

The amount of hydrogen peroxide used in the reaction is generally about one mol per mol of aromatic aldehyde. It is possible without disadvantage, to carry out the reaction with less hydrogen peroxide than the stoichiometric requirements of the reaction (for example, by using 0.5 mol of $H_2O_2$ per mol of aldehyde) or with an excess which can be 50% relative to the stoichiometric amount e.g. a range of 0.5 to 1.5 mol $H_2O_2$ per mol of aldehyde can be used. The hydrogen peroxide is usually used in the form of an aqueous solution, the concentration of which is not critical.

The oxidation of the aldehydes of the formula (II) using hydrogen peroxide can be carried out in the absence of any solvent or diluent other than the water supplied by the oxidizing agent, if the aldehyde is liquid under the conditions of the reaction. In all cases, it is also possible to carry out the reaction in the presence of an additional amount of water or in the presence of an organic solvent which is inert under the conditions of the reaction, such as an aliphatic hydrocarbon (a hexane) and cycloaliphatic hydrocarbons (cyclohexane), aromatic hydrocarbon (benzene, toluene or xylene), ether (diethyl ether), or halogenated hydrocarbon (chloroform, methylene chloride, 1,2-dichloroethane, chlorobenzene or benzyl chloride). The concentration of the aldehyde in the reaction medium is not critical.

The temperature, at which the reaction is carried out, can vary within wide limits depending on the aldehyde being oxidized. The temperatures employed are preferably between 0° and 150°C, and especially between 20° and 120°C.

The phenol formed during the reaction is present as its formate, although, depending on the conditions, a part of the latter can be hydrolysed to the free phenol by the water present in the reaction medium. The phenol can be prepared from its formate by transesterification e.g. using a volatile alcohol (e.g. methanol or ethanol) or by hydrolysis. The reagents and the conditions for carrying out the process are suitable for continuous operation.

The following Examples illustrate the invention.

EXAMPLE 1

3.98 g of p-tolualdehyde (0.033 mol) are introduced into a 100 cm³ 3-necked flask, equipped with a stirrer, a dropping funnel and a reflux condenser. The contents of the flask are heated to 60°C and then 0.03 g of 95% by weight sulphuric acid ($3.26 \times 10^{-4}$ mol) and 1.26 g of 96% by weight hydrogen peroxide solution (0.035 mol) are added. After 20 minutes of reaction, there is no more active oxygen in the reaction mixture, which is then cooled to 20°C.

1.06 g of unconverted p-tolualdehyde (degree of conversion 73%) and 1.85 g of p-cresol are measured by gas-liquid chromatography. The yield relative to the p-tolualdehyde converted amounts to 70%.

EXAMPLE 2

3.98 g of p-tolualdehyde (0.033 mol) and 10 cm³ of para-xylene are introduced into the apparatus described in Example 1. The contents of the flask are heated to 90°C and then 0.023 g of 100% by weight $H_2SO_4$ and 1.26 g of 96% by weight hydrogen peroxide solution are added. After one hour under these conditions, the reaction mixture no longer contains any active oxygen. 1.2 g of unconverted p-tolualdehyde (degree of conversion 70%) and 1.65 g of p-cresol (yield: 66% relative to the aldehyde converted) are measured by gas-liquid chromatography.

By way of comparison, this experiment is repeated in the absence of sulphuric acid, starting with 8.2 g of p-tolualdehyde. The active oxygen disappears completely in 4 hours 15 minutes. 1.07 g of p-cresol, i.e. a yield of 15% relative to the p-tolualdehyde (degree of conversion 100%) are measured by gas-liquid chromatography.

EXAMPLE 3

The procedure of Example 1 is followed, under the following conditions:

| | |
|---|---|
| temperature | 110°C |
| duration | 16 minutes |
| 70% by weight $H_2O_2$ | 1.73 g (0.035 mol) |
| p-tolualdehyde | 3.98 g (0.033 mol) |
| 95% by weight $H_2SO_4$ | 0.06 g |
| xylene | 10 cm³ |

1.92 g of p-tolualdehyde (degree of conversion 52%) and 1 g of p-cresol, which corresponds to a yield of 54% relative to the p-tolualdehyde converted, are measured in the reaction mixture by gas-liquid chromatography.

We claim:

1. Process for the preparation of an oxidation product containing a major amount of an alkyl-phenol of the general formula:

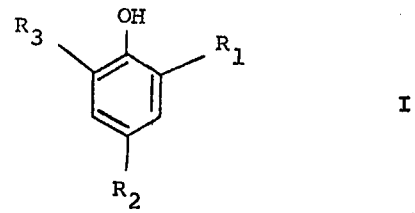

I wherein each of $R_1$, $R_2$ and $R_3$ which may be the same or different, represents a hydrogen atom or a linear or branched alkyl radical containing 1 to 5 carbon atoms, with the proviso that the number of alkyl groups represented by symbols $R_1$, $R_2$ and $R_3$ is 1 or 2; or a formate ester of said alkyl phenol, which comprises oxidizing an alkylbenzaldehyde of the general formula:

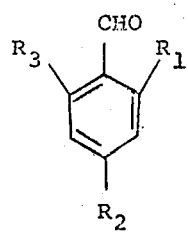

II wherein $R_1$, $R_2$ and $R_3$ are as defined above, with hydrogen peroxide in the presence of an acid with a dissociation constant in water greater than $10^{-3}$, which is an inorganic acid or sulphonic acid, and converting any formate ester of the phenol of formula I formed into the phenol of formula I.

2. Process according to claim 1, wherein the acid is an oxygen-containing inorganic acid, a hydrohalic acid or an aliphatic, cycloaliphatic or aromatic sulphonic acid.

3. Process according to claim 2, wherein the acid is sulphuric acid, perchloric acid, hydrochloric acid or p-toluene-sulphonic acid.

4. Process according to claim 1, wherein the amount of hydrogen peroxide is between 0.5 and 1.5 mol per mol of the alkylbenzaldehyde.

5. Process according to claim 1 wherein the reaction is carried out in the presence of an amount of acid contributing $1 \times 10^{-4}$ to 0.5 protons per molecule of hydrogen peroxide.

6. Process according to claim 1, wherein the reaction is carried out at a temperature of between 0°C and 150°C.

7. Process according to claim 1, wherein each of $R_1$, $R_2$ and $R_3$ which may be the same or different, represents a hydrogen atom or a methyl, ethyl, n-propyl, isopropyl, tert-butyl or n-pentyl group, with the proviso that the number of alkyl groups represented by $R_1$, $R_2$ and $R_3$ is 1 or 2.

8. Process according to claim 1 wherein the formate ester is converted to the phenol by hydrolysis.

9. Process according to claim 1 wherein p-tolualdehyde is oxidized at 60°–110°C to p-cresol with 1.06 mol hydrogen peroxide per mol p-tolualdehyde in the presence of $7.45 \times 10^{-3}$ to $1.86 \times 10^{-2}$ mol sulphuric acid per mol hydrogen peroxide.

10. Process according to claim 1 wherein the formate ester is converted to the phenol by transesterification.

* * * * *